Patented Dec. 21, 1926.

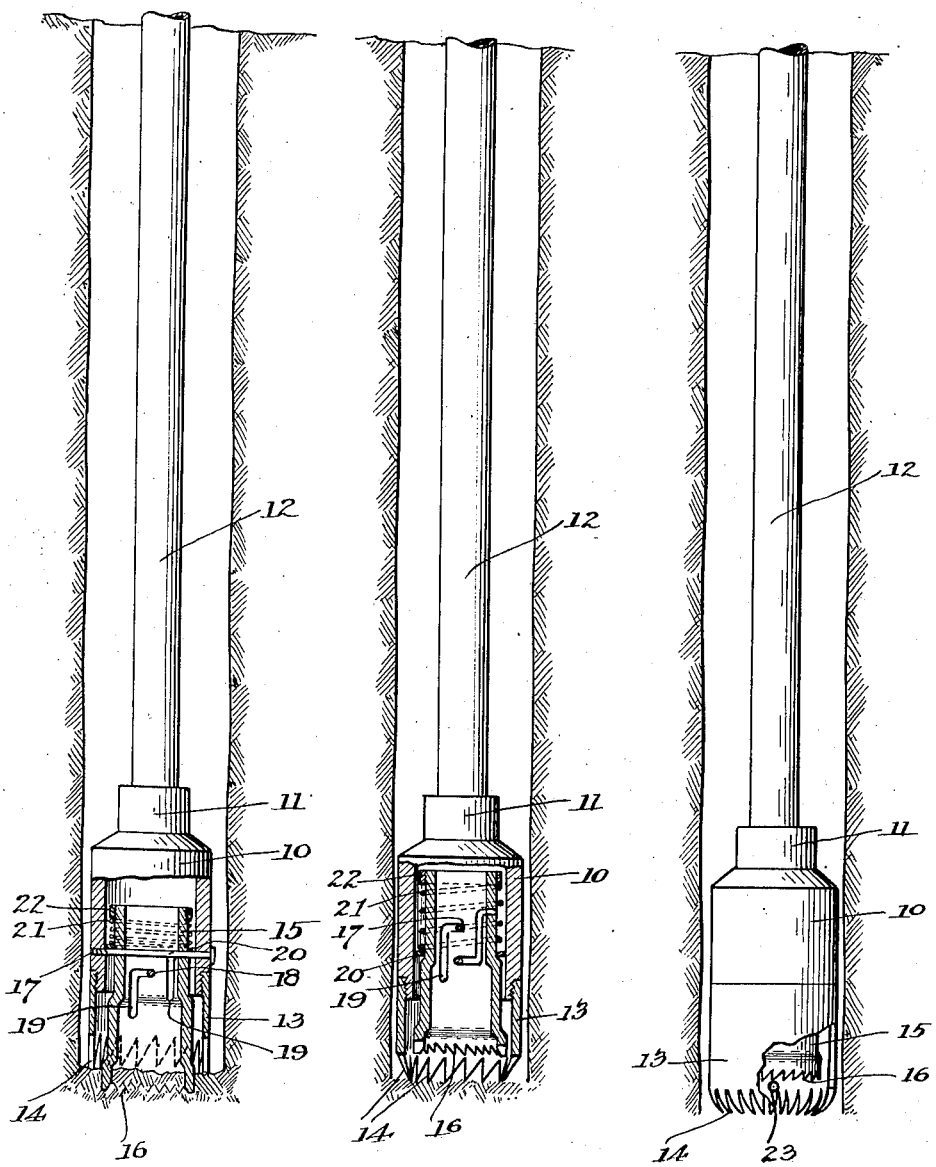

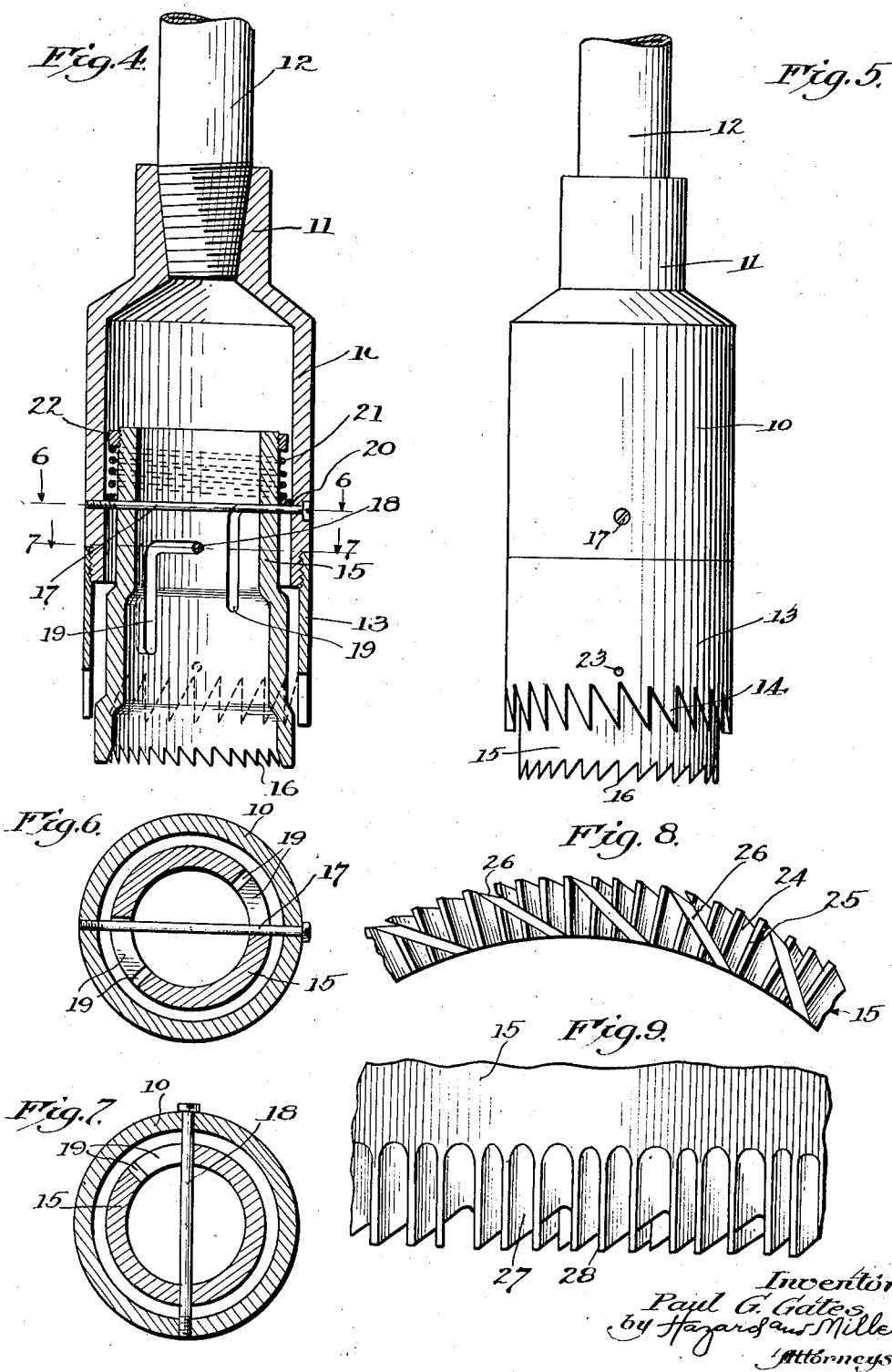

1,611,831

UNITED STATES PATENT OFFICE.

PAUL G. GATES, OF LONG BEACH, CALIFORNIA.

COMBINATION MILLING TOOL AND BASKET.

Application filed April 20, 1926. Serial No. 103,222.

This invention relates to improvements in fishing tools used in well drilling operations, and particularly to that class of fishing tools known as milling cutters and baskets.

An object of this invention is to provide an improved fishing tool in which there is a milling cutter and a mechanism associated with the milling cutter adapted to engage upon and retain the fish or the article after it has been cut over or cut about by the milling cutter, so that the fish may be freed and withdrawn from the well hole in a single operation.

Heretofore when it has been necessary to mill out a fish in a well hole, a milling cutter is lowered into the well hole and rotated over and about the fish. The milling cutter is then completely withdrawn from the well hole, and a second tool is lowered which will bring up the freed or loosened fish. By the improved construction the fish may be cut about and freed or loosened and withdrawn from the well hole in the same operation, so that considerable time is saved and there is no danger of mud settling upon the fish while the second tool is being lowered, as was heretofore experienced.

Another object of this invention is to provide an improved milling cutter having teeth of novel form which will cause the milling cutter to center itself over the fish while cutting.

With the foregoing and other objects in view which will be made manifest in the following detailed description and specifically pointed out in the appended claims, reference is had to the accompanying drawings for an illustrative embodiment of the invention, wherein:

Figure 1 is a vertical section through a well hole illustrating the improved tool in applied position therein during cutting or milling operations, Fig. 2 is a view similar to Fig. 1, illustrating the tool after the fish has been cut, Fig. 3 is a view similar to Fig. 1, illustrating the manner in which the cut off portion of the fish is grasped so that it may be removed from the well hole, Fig. 4 is a vertical section through the improved tool, Fig. 5 is a side elevation of the same, Fig. 6 is a horizontal section taken upon the line 6—6 of Fig. 4, Fig. 7 is a horizontal section taken on the line 7—7 of Fig. 4, Fig. 8 is a bottom plan view of a portion of the milling cutter illustrating its construction, and Fig. 9 is a partial side elevation of a portion of the milling cutter as illustrated in Fig. 8.

Referring to the accompanying drawings wherein similar reference characters designate similar parts throughout, the improved fishing tool consists of a cylindrical body 10 having its upper end reduced as at 11 and internally fitted for attachment to drill pipe 12. On the lower end of the cylindrical body 10 there is secured a sleeve 13 having its bottom edge toothed, as indicated at 14, the teeth presenting edges which are inclined toward the right, as clearly shown in Fig. 5. The sleeve 13 is preferably formed of a relatively soft metal, so that the teeth 14 are bendable, as illustrated in Fig. 3. Fitting within the body 10 and within the sleeve 13 is a milling cutter, the body of which is indicated at 15 having its lower edge toothed, as indicated at 16. Two removable pins 17 and 18 extend diametrically across the body 10 and through the body 15 of the milling cutter. These pins are arranged one above the other and preferably at right angles to each other. In the body 15 of the milling cutter there are formed angular slots 19 through which the pins 17 and 18 may pass or slide. A ring 20 fits about the upper end of the body 15 of the milling cutter and rests upon the upper pin 17. This ring constitutes a spring seat for a compression coil spring 21. The upper spring seat for the compression spring 21 is formed by a ring 22 which is threaded onto the top of the body of the milling cutter.

The operation of the tool is as follows: When the tool is lowered into the well, the milling cutter assumes the position with respect to the body of the tool as shown in Figs. 1, 4 and 5, that is, with the teeth 16 of the milling cutter extending below the teeth 14 on the sleeve 13. When the tool encounters the fish, the drill pipe 12 is rotated toward the right, as is conventional, and the milling cutter will cut about the fish so as to free or loosen the fish or to cut off a portion if such is necessary. When the milling cutter has completed the cutting operation, the drill pipe 12 is stopped rotating and is reversely rotated about a quarter of a revolution. This causes the pins 17 and 18 to slide within their respective slots 19 and as soon as the pins are opposite or directly above the vertical portion of the slots, the compression spring 21 will lift the milling cutter, causing it to assume the position shown in Fig. 2. When the milling cutter is doing the cutting, a fair proportion of the weight of the drill pipe is resting on it, so that there is no stretching of the drill pipe because of its weight. When the milling cutter is released, so that it may assume a position within the body, the drill pipe, because of its weight, which is then unsupported at the bottom of the well hole, stretches, lowering the bendable teeth 14 into engagement with the bottom of the well hole so that they will be in a position capable of engaging the fish. Consequently, in actual practice the actual movements of the tool in the bottom of the well hole are that the milling cutter remains practically stationary, when the pins 17 and 18 are caused to enter the vertical portions of their respective slots, and that the drill pipe stretches and lowers the body 10 downwardly so that the bendable teeth 14 will engage the bottom of the well hole and the fish. When the tool is in this position, it is again rotated to the right. The bendable teeth 14 because of their shape will be bent inwardly during rotation, as shown in Fig. 3, so as to engage and retain the fish, enabling it to be withdrawn from the well hole. The sleeve 13 preferably has one or more apertures 23 formed in it, so that circulation fluid which may be in the drill pipe 12 can escape therethrough while the tool is being withdrawn from the well hole.

A feature of the invention resides in the formation of a milling cutter to be used in well drilling operations having a novel tooth formation. As clearly shown in Figs. 8 and 9, the teeth on the milling cutter are formed by transverse recesses 24, defining transverse cutting edges 25 which are disposed toward the right, so that the cutter will cut when turned toward the right. The recesses 24 are radially arranged from the center of the milling cutter. Grooves 26 are also formed across the teeth 16, and these grooves are other than radial, so that they cross several teeth. Consequently, the grooves cause vertical cutting edges to be formed on the teeth which are disposed toward the interior of the cutter. On the exterior surface of the body of the milling cutter there are formed recesses or grooves 27 providing cutting edges 28 which are also disposed toward the right.

This novel tooth formation on the milling cutter has the following advantages. If the fish or article to be cut is located near the side of the hole, when the milling cutter is rotating, the cutting edges 25 will first start to cut vertically downwardly. However, the vertical cutting edges defined by the grooves 26 crossing the teeth 16 tend to shift the complete milling cutter while it is being rotated, causing the milling cutter while rotating not only to cut downwardly on the fish but to center itself over the fish as much as possible. The vertical cutting edges 28 on the exterior of the milling cutter serve also to cut away any material which may be adjacent the exterior of the cutter to permit this self-centering action. It will be readily understood that this tooth formation on the milling cutter may be used on various other types of milling cutters used in well drilling operation, and will have the same advantages.

From the above described construction it will be appreciated that a novel and improved fishing tool is provided, in which the fish can be cut and removed from the hole in the same operation. After the fish has been withdrawn, the tool may be subsequently used by bending the teeth 14 vertically or replacing the sleeve 13.

It will be understood that various changes may be made in the detail of construction without departing from the spirit or scope of the invention as defined by the appended claims.

I claim:

1. A fishing tool comprising a milling cutter and means comprising a tubular member adapted to be caused to engage upon the article cut about by the milling cutter, said milling cutter being movably mounted upon said tubular member.

2. A fishing tool comprising a milling cutter and means comprising a tubular member adapted to be caused to engage and retain an article cut about by the cutter, said milling cutter being slidably mounted upon said tubular member.

3. A fishing tool comprising means for cutting a fish in the well hole in combination with means movable relatively to the cutting means and comprising a tubular member for grasping the article cut about by the cutting means.

4. A fishing tool comprising a body having a plurality of bendable teeth thereon, a milling cutter slidable within the body, and means for holding the milling cutter in a position wherein the teeth of the milling cutter project below the teeth on the body or in a position wherein the teeth of the milling cutter are disposed above the teeth on the body.

5. A fishing tool comprising a hollow cylindrical body, means providing bendable teeth upon the bottom of the body, a tubular cutter disposed within the body, spring means urging the cutter upwardly within said body, and means for temporarily holding said cutter down against the action of said spring means.

6. A fishing tool comprising a hollow cylindrical body, means providing bendable teeth upon the bottom of the body, a tubular cutter disposed within the body, spring means urging the cutter upwardly within said body, and pins extending diametrically across said body and through said cutter, there being angular slots formed in the cutter through which the pins extend whereby the cutter may be held down against the action of said spring means and later released.

7. A fishing tool comprising a tubular body having bendable teeth upon its bottom, a tubular cutter disposed within said body, pins extending diametrically across the body and through angular slots formed in the cutter, a ring positioned upon the uppermost pin, a second ring mounted upon the top of the body, and a coil spring compressed between said rings.

In testimony whereof I have signed my name to this specification.

PAUL G. GATES.